April 17, 1962 — T. B. MARDEN, JR — 3,029,510
LUBRICATOR FOR HEAVY-DUTY PORTABLE NIBBLER
Filed May 26, 1961 — 2 Sheets-Sheet 1

INVENTOR
TILGHMAN B. MARDEN, JR.
BY
ATTORNEY

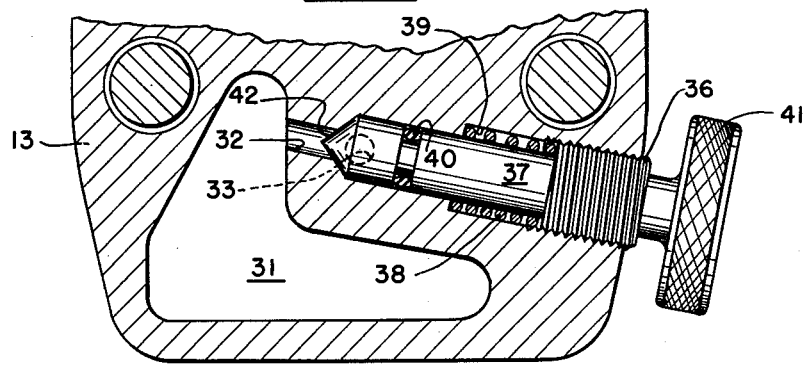
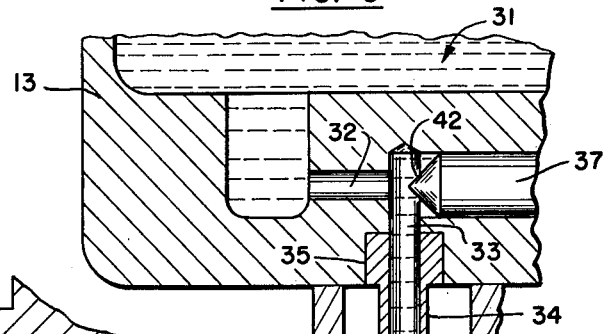
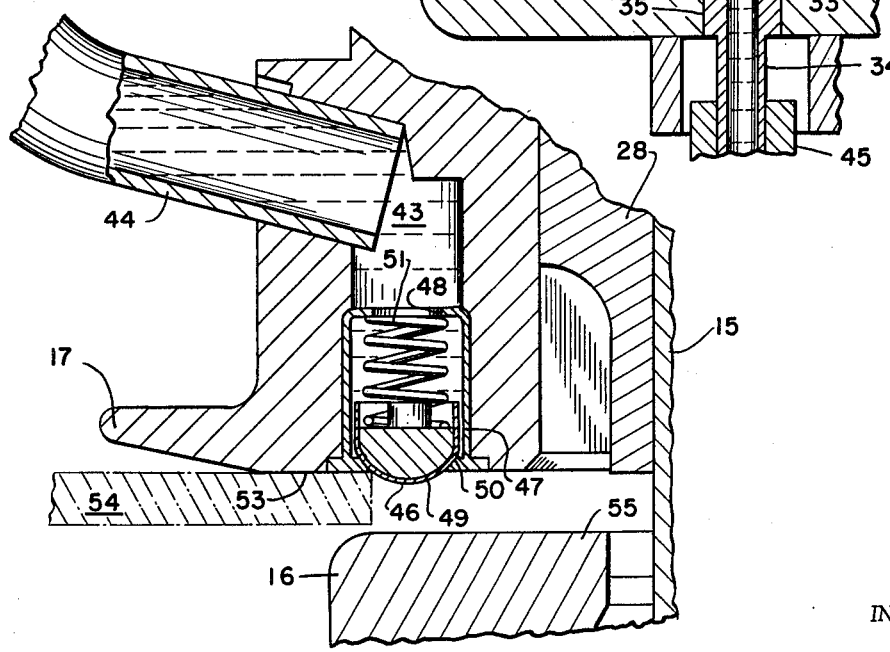

United States Patent Office 3,029,510
Patented Apr. 17, 1962

3,029,510
LUBRICATOR FOR HEAVY-DUTY PORTABLE NIBBLER
Tilghman B. Marden, Jr., Baltimore, Md., assignor to The Black and Decker Manufacturing Company, Towson, Md., a corporation of Maryland
Filed May 26, 1961, Ser. No. 112,829
6 Claims. (Cl. 30—123)

The present invention relates to a lubricator for a heavy-duty portable nibbler, and more particularly, to such a lubricator that is actuated by feeding the tool into the workpiece so as to deposit a coating of lubricant on the workpiece immediately prior to the nibbling operation of the punch.

It is an object of the present invention to provide a lubricator for a heavy-duty portable nibbler, wherein the housing of the tool includes a lubricant reservoir, and wherein a regulating valve is carried by the tool housing to control the amount of lubricant flowing from the reservoir.

It is another object of the present invention to provide, for use with a heavy-duty portable nibbler, a lubricator including a valve having an inwardly-depressible work-engaging element, whereby as the tool is fed into the workpiece, the work-engaging element of the valve will be depressed to allow a coating of lubricant to be deposited on the workpiece.

It is yet another object of the present invention to provide a lubricator whose conduit means from the lubricant reservoir includes an external transparent tube, whereby the flow of lubricant may be observed by the operator.

It is yet still another object of the present invention to provide a lubricator which is relatively inexpensive, easy to manufacture and install, does not add to the bulk and complexity of the tool, does not detract from its symmetry, nor interfere with its convenience in use, and which is inherently rugged and reliable for long and continuous service.

It is a further object of the present invention to provide a lubricator for a heavy-duty portable nibbler, wherein the amount of lubricant is metered, and wherein the lubricant is automatically applied only when a workpiece is actually being engaged with the tool, thus preventing the lubricant in the reservoir from being rapidly depleted, and thus allowing a clean and neat cut to be made.

It is a still further object of the present invention to provide a lubricator for a heavy-duty portable nibbler, which will increase the cutting rates of the tool, and which will facilitate greater punch and die life and reliability.

These and other objects of the present invention will become apparent from a reading of the following specification, taken in conjunction with the enclosed drawings, in which:

FIGURE 4 is a view taken along the lines 4—4 of FIGURE 1, showing the details of the needle valve that regulates the flow of oil;

FIGURE 5 is a view taken along the lines 5—5 of FIGURE 2, showing a portion of the oil conduit means; and FIGURE 6 is an enlarged sectional view of the ball valve portion of the lubricator, showing a workpiece in broken lines to indicate the means for actuating the ball valve to deposit oil on the workpiece.

Figure 1:
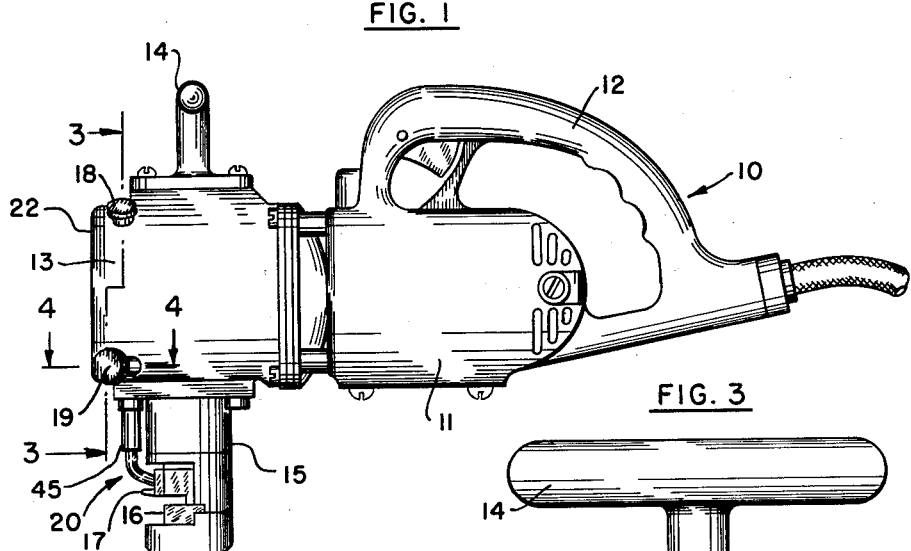
FIGURE 1 is a side elevational view of a heavy-duty portable nibbler, showing the oil tube, needle valve, and filler cap in elevation.

With reference to FIGURE 1, there is illustrated a heavy-duty portable nibbler 10 with which the techniques of the present invention may find more particular utility. The nibbler 10 includes a motor housing 11, switch handle 12, gear case 13 secured to motor housing 11, an overhead auxiliary handle 14, a shoe 15, a die 16, a stripper 17, an oil filler cap 18, a needle valve 19, and oil conduit means indicated generally as at 20.

Figure 2:
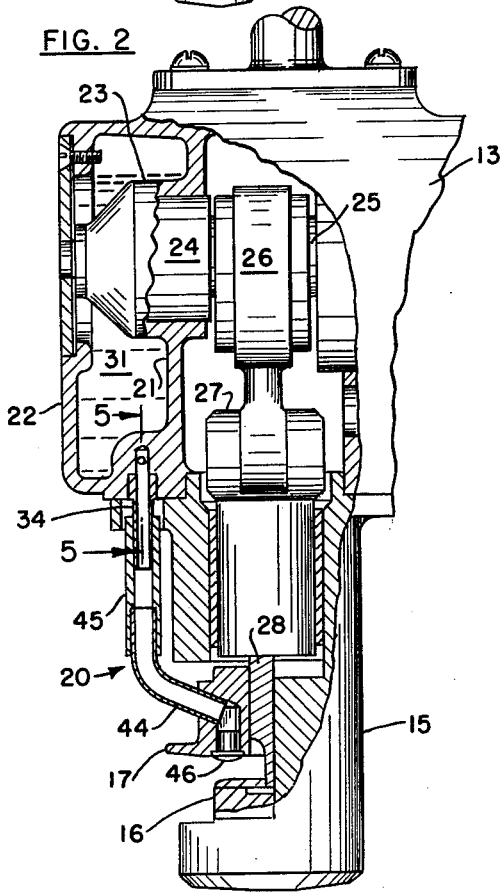
FIGURE 2 is an enlarged longitudinal section of the forwardmost portion of the tool, showing the structure of the lubricant partly in section and partly in elevation.
Figure 3:
FIGURE 3 is a view taken along the lines 3—3 of FIGURE 1, showing the oil reservoir, needle valve, and conduit means.
Figure 3:
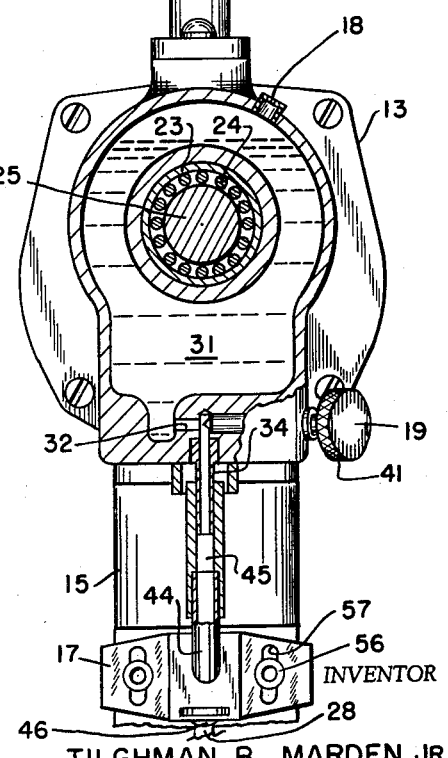

With reference to FIGURES 2 and 3, the gear case 13 is provided with an interior wall 21 and a substantially flat forward face 22, and the interior wall 21 is formed with an internal bearing boss 23 within which a needle bearing 24 is retained. A spindle 25 is journaled within bearing 24, and an eccentric 26 is mounted upon the spindle 25. A reciprocating yoke 27 is pivotably secured to the eccentric 26, and a punch 28 is secured to the yoke 27 by conventional means. The punch 28 cooperates with the die 16 carried by the lowermost portion of the shoe 15, and a stripper 17 is also carried by the shoe 15 forwardly of the punch 28 and above the die 16. Accordingly, it will be understood by those skilled in the art that a workpiece, such as No. 8 gauge sheet metal which is approximately 5⁄32" thick, and of various compositions and alloys, may be inserted between the flat undersurface of the stripper 17 and the flat top surface of the die 16, such that the nibbler 10 may then be fed into the workpiece by the operator, and such that the reciprocating punch 28 in cooperation with the die 16 will punch out a continuous series of small pieces of material, thereby forming a kerf in the workpiece. Such a tool as the nibbler 10 is especially suitable for sheet metal work in heavy-duty applications; and in the particular embodiment illustrated herein, the nibbler 10 develops a force which is equal to the force of a two-ton punch press.

With reference to FIGURES 2, 3, 4, and 5, the gear case 13 includes an internal lubricant reservoir 31, which is formed between wall 21 and the forward face 22 of the gear case 13, and also, concentrically about the bearing boss 23. The reservoir 31 contains a quantity of lubricant, and as shown more particularly in FIGURE 2, the lubricant comprises a quantity of oil that is added by means of the filler cap 18; in the particular embodiment herein illustrated, the reservoir 31 holds about 2 oz. of oil. The duct means for the oil includes an internal transverse canal 32 leading from the reservoir 31 into a vertical passageway 33 which communicates with the canal 31; and a pilot tube 34, communicating with the passageway 33, is press-fitted in a bore 35 in the gear case 13. As shown more clearly in FIGURES 4 and 5, the gear case 13 carries a needle valve 19 to regulate the flow of oil from the reservoir 31; and the needle valve 19 includes a threaded portion 36 engaging corresponding internal threads in the gear case 13, a plunger 37, a spring 38 in a bore 39 formed in the gear case 13, the spring 38 being wound concentrically about the plunger 37, an O-ring 40 carried by the plunger 37 for sealing purposes, a knurled external portion 41 to facilitate a manual manipulation, and an inwardly-directed conical tip 42 piloted in the canal 32. In such a manner, the quantity of oil flowing from the reservoir 31 may be controlled within close limits.

With reference to FIGURES 1, 2, 3, and 6, the stripper 17 is provided with an internal passage 43, and an adapter tube 44 is carried by the stripper 17 and communicates with the internal passage 43. The pilot tube 34 and the adapter tube 44, each of which may be made of metal, have aligned respective portions outwardly of the gear case 13 and forwardly of the shoe 15, and a substantially transparent flexible tube 45 is connected intermediately of the aligned portions of tubes 34 and 44; and in such a manner, the operator may observe the flow of oil in the oil conduit means 20 and thus be informed of the necessity of replenishing the supply of lubricant in reservoir 31.

With reference to FIGURE 6, a ball valve 46 is press-fitted within a bore 47 in stripper 17 and communicates with the internal passage 43 in stripper 17 by means of an opening 48. The valve 46 is provided with an inwardly-depressible semispherical work-engaging element 49, which is urged outwardly of the valve 46 (against a valve seat 50) by means of a compression spring 51. In the static position illustrated in FIGURE 6, the element 49 projects beyond the substantially flat undersurface 53 of stripper 17; and the nibbler 10 is fed into a workpiece 54 in such a manner that the workpiece 54 is received between the flat undersurface 53 of stripper 17 and the flat top surface 55 of die 16, it being appreciated that the flat undersurface 53 of the stripper 17 will rest upon the top surface of the workpiece 54 as a result of the operator pressing down upon the nibbler 10. Thus, the workpiece 54 engages element 49 and depresses element 49 inwardly against the tension of spring 51 so as to allow oil to flow around the valve seat 50 and out of ball valve 46, with the result that a coating of oil is deposited on the top surface of the workpiece 54 immediately prior to the workpiece 54 being engaged by the punch 28.

Moreover, it will be appreciated that the nibbler 10 herein illustrated will accommodate various thicknesses of metal (up to and including No. 8 gauge steel), that the stripper 17 is adjustable vertically on the shoe 15 (by means of bolts 56 operating in slots as shown in FIGURE 3) so as to increase or decrease the vertical spacing between stripper 17 and die 16, and that for best results, the stripper 17 should be adjusted such that the bottom surface of the workpiece 54 just clears the top surface 55 of die 16, while the top surface of the workpiece 54 rests against the undersurface 53 of stripper 17. Furthermore, it will be recalled that the transparent tube 45 is flexible, and hence, any vertical movement of the stripper 17 will be compensated for by a flexing or slight bending of the transparent tube 45, the pilot tube 34 remaining stationary in gear case 13 and the adapter tube 44 being carried along with the stripper 17. Also, if the bending or flexing of transparent tube 45 is excessive, the operator may simply push the tube 45 along tube 34 (or tube 44) to take up the slack, it being appreciated that the force fit of tube 45 with respect to either of the tubes 34 and 44, may be over-ridden by the operator.

Obviously, many modifications may be made without departing from the basic spirit of the present invention; and therefore, within the scope of the appended claims, the invention may be practiced other than has been specifically described.

I claim:

1. In a portable power-driven nibbler, the combination of a housing, a shoe secured to said housing and depending therefrom, a member reciprocating in said housing, a punch secured to said member and depending therefrom, said shoe having a lowermost portion, a die carried by said lowermost portion and adapted to cooperate with said punch, a stripper supported by said shoe above said die and forwardly of said punch, said housing having an internal lubricant reservoir and further having duct means leading from said reservoir, regulating valvular means in said duct means, said stripper having a substantially flat undersurface and further having an internal passage terminating at said undersurface, second valvular means within said internal passage, said second valvular means including an inwardly-depressible work-engaging element protruding beyond said undersurface of said stripper and further including resilient means urging said depressible element beyond said undersurface, and lubricant conduit means connecting said duct means with said internal passage in said stripper, whereby a workpiece may be fed between said die and said undersurface of said stripper, thereby depressing said element inwardly and allowing lubricant to flow upon the workpiece.

2. The combination according to claim 1, wherein said duct means comprises an internal transverse canal leading from said reservoir, and an internal vertical passageway communicating with said canal and leading to said lubricant conduit means, and wherein said regulating valvular means comprises an externally-manipulatable needle valve carried by said housing and having an inwardly-directed conical tip piloted in said canal, whereby the flow of lubricant is metered.

3. The combination according to claim 1, wherein said lubricant conduit means comprises a pilot tube carried by said housing and communicating with said duct means, an adapter tube carried by said stripper and communicating with said internal passage in said stripper, said pilot tube and said adapter tube each having aligned portions outwardly of said housing and forwardly of said shoe, and a substantially transparent flexible tube connected intermediately of said aligned portions.

4. The combination according to claim 1, wherein said housing has a forwardmost portion including an internal bearing boss, a bearing in said boss and a spindle journaled in said bearing, said forwardmost portion including a cavity formed concentrically between said bearing boss and the walls of said housing, whereby said lubricant reservoir is formed in said housing.

5. In a power-driven tool, the combination of a housing having a lubricant reservoir therein, a first work-engaging member carried by said housing and having a flat undersurface, a second member carried by said housing and having a flat top surface, whereby a workpiece may be fed to the tool between said first and second members, a valve carried by said work-engaging member, said valve having an inwardly-depressible work-engaging element and further having resilient means to urge said depressible element beyond the surface of said member, lubricant conduit means from said reservoir to said valve, said conduit means including an external transparent flexible tube, and a regulating valve in said lubricant conduit means.

6. In a power-driven tool, the combination of a housing having an internal lubricant reservoir therein, a member carried by said housing and having a flat work-engaging surface, a valve carried by said member, said valve having an inwardly-depressible work-engaging element normally protruding beyond said flat undersurface, said valve further having means to urge said work-engaging element beyond said flat undersurface of said member, lubricant conduit means from said reservoir to said valve, and a regulating valve in said conduit means.

References Cited in the file of this patent

UNITED STATES PATENTS

| | | |
|---|---|---|
| 1,179,477 | Thomas | Apr. 18, 1916 |
| 1,822,468 | Wales | Sept. 8, 1931 |

FOREIGN PATENTS

| | | |
|---|---|---|
| 360,252 | Germany | Sept. 30, 1922 |